(12) United States Patent
Onuki

(10) Patent No.: US 11,743,618 B2
(45) Date of Patent: Aug. 29, 2023

(54) PHOTOELECTRIC CONVERSION DEVICE, PHOTOELECTRIC CONVERSION SYSTEM, AND MOVING BODY

(71) Applicant: CANON KABUSHIKI KAISHA, Tokyo (JP)

(72) Inventor: Yusuke Onuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/588,469

(22) Filed: Jan. 31, 2022

(65) Prior Publication Data

US 2022/0247963 A1    Aug. 4, 2022

(30) Foreign Application Priority Data

Feb. 3, 2021 (JP) .................................. 2021-016039

(51) Int. Cl.
*H04N 25/772* (2023.01)
*H04N 25/75* (2023.01)

(52) U.S. Cl.
CPC ........... *H04N 25/772* (2023.01); *H04N 25/75* (2023.01)

(58) Field of Classification Search
None
See application file for complete search history.

(56) References Cited

U.S. PATENT DOCUMENTS

| | | | |
|---|---|---|---|
| 8,115,848 B2 | 2/2012 | Onuki et al. | |
| 8,427,564 B2 | 4/2013 | Yamashita et al. | |
| 9,716,849 B2 | 7/2017 | Kobayashi et al. | |
| 9,894,295 B2 | 2/2018 | Kawabata et al. | |
| 10,009,560 B2 | 6/2018 | Kobayashi et al. | |
| 10,021,321 B2 | 7/2018 | Kawabata et al. | |
| 10,186,532 B2 | 1/2019 | Kobayashi et al. | |
| 10,205,894 B2 | 2/2019 | Kawabata et al. | |
| 10,263,028 B2 | 4/2019 | Takami et al. | |
| 10,483,307 B2 | 11/2019 | Sekine et al. | |
| 10,498,979 B2 | 12/2019 | Kobayashi et al. | |
| 10,535,688 B2 | 1/2020 | Onuki et al. | |
| 10,764,520 B2 | 9/2020 | Onuki et al. | |
| 10,805,563 B2 | 10/2020 | Ikeda et al. | |

(Continued)

FOREIGN PATENT DOCUMENTS

| | | |
|---|---|---|
| CN | 111741244 A2 | 10/2020 |
| JP | 2020-039114 A | 3/2020 |

OTHER PUBLICATIONS

Search Report dated May 18, 2022, in European Patent Application No. 22152372.3.

*Primary Examiner* — Mark T Monk
(74) *Attorney, Agent, or Firm* — Venable LLP

(57) ABSTRACT

A photoelectric conversion device includes a photoelectric converter, a first node configured to be supplied with charges from the photoelectric converter, an amplification transistor configured to output a signal corresponding to a voltage of the first node, a first transistor configured to open/close a path between the first node and a second node not included in a path from the photoelectric converter to the first node, and a second transistor configured to open/close a path between the second node and a third node. A second capacitance which is added to the second node when the second transistor is set in a conductive state is larger than a first capacitance which is added to the first node when the first transistor is set in a conductive state.

22 Claims, 15 Drawing Sheets

(56) References Cited

U.S. PATENT DOCUMENTS

| | | |
|---|---|---|
| 10,848,695 B2 | 11/2020 | Miki et al. |
| 11,271,022 B2 | 3/2022 | Dnuki |
| 2006/0131624 A1 | 6/2006 | Katsuno et al. |
| 2008/0173909 A1* | 7/2008 | Parks .................. H04N 5/3745 |
| | | 348/E3.018 |
| 2009/0295973 A1 | 12/2009 | Oshikubo et al. |
| 2017/0257590 A1* | 9/2017 | Kato ........................ G01C 3/08 |
| 2017/0263669 A1 | 9/2017 | Tamaki et al. |
| 2018/0124345 A1* | 5/2018 | Aoki .................. H01L 27/0207 |

* cited by examiner

FIG. 5

|   |          | CAPACITANCE OF EACH UNIT |                            |                             |
|---|----------|--------------------------|----------------------------|-----------------------------|
|   |          | FD 203                   | FIRST TRANSISTOR 210       | SECOND TRANSISTOR 211       |
| 1 | PIXEL 20A|                          | 0.75                       |                             |
| 2 | PIXEL 20B| 0.25                     | 0.50                       | 0.25                        |
| 3 | PIXEL 20C|                          | 0.25                       | 0.50                        |

FIG. 6

| | | a | b | c | d | e | f | g |
|---|---|---|---|---|---|---|---|---|
| | | GAIN | SIGNAL CHARGE | CAPACI-TANCE | NOISE CHARGE | S SIGNAL OUTPUT | N NOISE OUTPUT | N/S RATIO |
| 1 | PIXEL 20A | 1 | 10000 | 1 | 100 | 10000 | 100 | 0.01 |
| | | 2 | 5000 | 1 | 100 | 10000 | 200 | 0.02 |
| | | 4 | 2500 | 0.25 | 25 | 10000 | 100 | 0.01 |
| | | 8 | 1250 | 0.25 | 25 | 10000 | 200 | 0.02 |
| | | 16 | 625 | 0.25 | 25 | 10000 | 400 | 0.04 |
| 2 | PIXEL 20B | 1 | 10000 | 1 | 100 | 10000 | 100 | 0.01 |
| | | 2 | 5000 | 0.75 | 75 | 10000 | 150 | 0.015 |
| | | 4 | 2500 | 0.25 | 25 | 10000 | 100 | 0.01 |
| | | 8 | 1250 | 0.25 | 25 | 10000 | 200 | 0.02 |
| | | 16 | 625 | 0.25 | 25 | 10000 | 400 | 0.04 |
| 3 | PIXEL 20C | 1 | 10000 | 1 | 100 | 10000 | 100 | 0.01 |
| | | 2 | 5000 | 0.5 | 50 | 10000 | 100 | 0.01 |
| | | 4 | 2500 | 0.25 | 25 | 10000 | 100 | 0.01 |
| | | 8 | 1250 | 0.25 | 25 | 10000 | 200 | 0.02 |
| | | 16 | 625 | 0.25 | 25 | 10000 | 400 | 0.04 |

| OPERATION | Φ210 | Φ211 | Φ204 |
|---|---|---|---|
| A | ON | ON | ON/OFF |
| B | ON | ON/OFF | ON |
| C | ON/OFF | ON | ON |

| OPERATION | Φ210 | Φ211 | Φ212 | Φ204 |
|---|---|---|---|---|
| A | ON | ON | ON | ON/OFF |
| B | ON | ON/OFF | ON | ON |
| C | ON/OFF | ON | ON | ON |

PHOTOELECTRIC CONVERSION DEVICE, PHOTOELECTRIC CONVERSION SYSTEM, AND MOVING BODY

BACKGROUND OF THE INVENTION

Field of the Invention

The present invention relates to a photoelectric conversion device, a photoelectric conversion system, and a moving body.

Description of the Related Art

Japanese Patent Laid-Open No. 2020-039114 discloses an arrangement including the first capacitance addition transistor having one end connected to a floating diffusion unit (to be referred to as an FD unit hereinafter) and the other end connected to a reset transistor in order to expand the dynamic range in an image capturing device. Japanese Patent Laid-Open No. 2020-039114 also discloses an arrangement including the second capacitance addition transistor between the reset transistor and the first capacitance addition transistor. Furthermore, Japanese Patent Laid-Open No. 2020-039114 discloses an arrangement of applying an intermediate voltage between high level and low level to the reset transistor, the first capacitance addition transistor, or the second capacitance addition transistor in order to suppress the voltage amplitude of the FD unit corresponding to a high luminance signal.

SUMMARY OF THE INVENTION

One of aspects of the present invention provides a photoelectric conversion device comprising: a photoelectric converter; a first node configured to be supplied with charges from the photoelectric converter; an amplification transistor configured to output a signal corresponding to a voltage of the first node; a first transistor configured to open/close a path between the first node and a second node not included in a path from the photoelectric converter to the first node; and a second transistor configured to open/close a path between the second node and a third node, wherein a second capacitance which is added to the second node when the second transistor is set in a conductive state is larger than a first capacitance which is added to the first node when the first transistor is set in a conductive state.

Further features of the present invention will become apparent from the following description of exemplary embodiments with reference to the attached drawings.

BRIEF DESCRIPTION OF THE DRAWINGS

FIG. 5 is a table for explaining the first embodiment;

FIG. 6 is a table for explaining the first embodiment;

DESCRIPTION OF THE EMBODIMENTS

Figure 1:
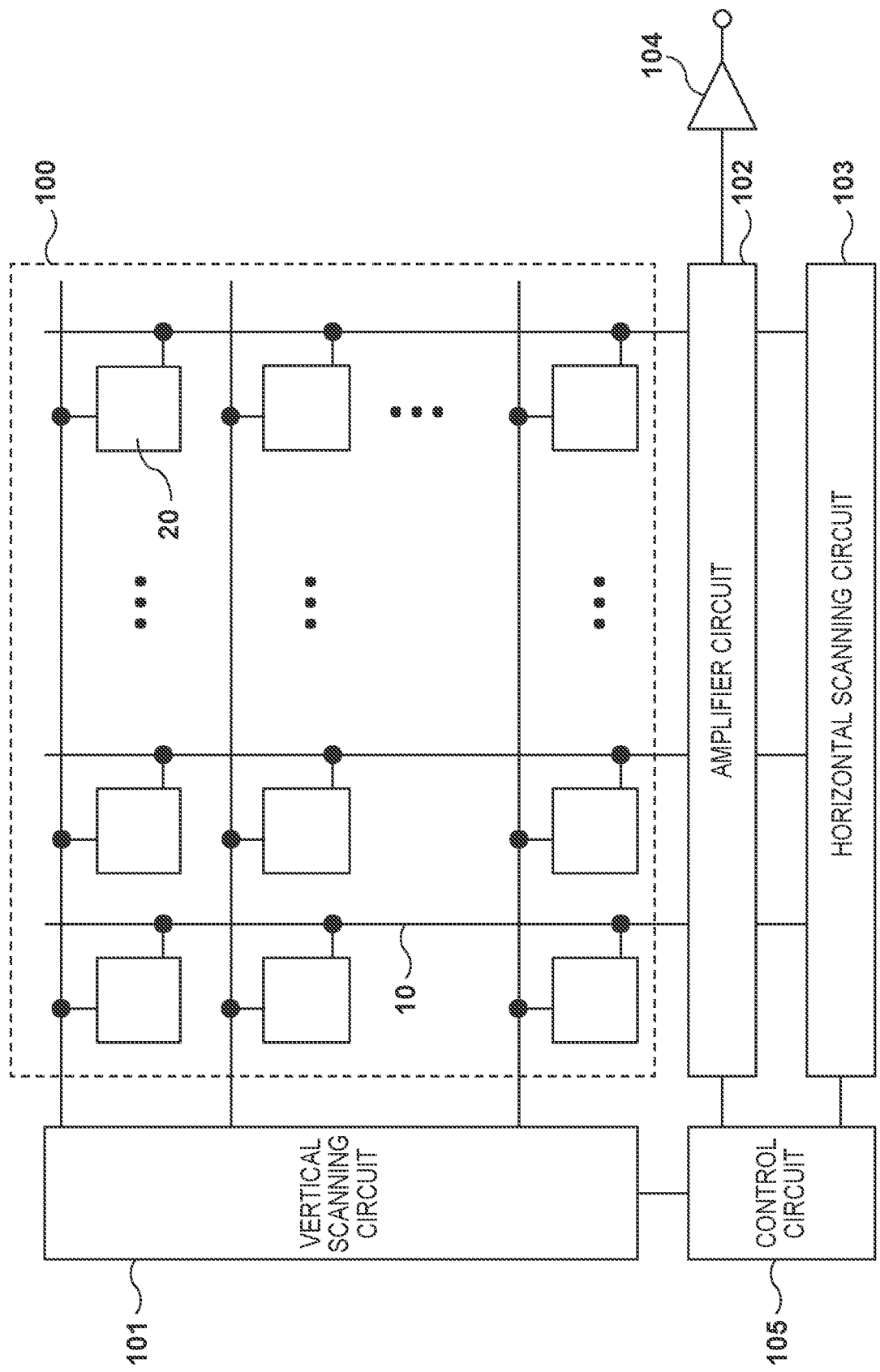
FIG. 1 is a block diagram showing the arrangement of an image capturing device according to the first to third embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 shows the schematic arrangement of an image capturing device 1 according to the first embodiment. The image capturing device 1 can include, for example, a pixel array 100, a vertical scanning circuit 101, an amplifier circuit 102, a horizontal scanning circuit 103, an output circuit 104, and a control circuit 105. The pixel array 100 can include a plurality of pixels 20 arranged to form a plurality of rows and a plurality of columns. The vertical scanning circuit 101 can be configured to select the plurality of pixel 20 on the row basis. The vertical scanning circuit 101 can be configured to drive a plurality of control lines for controlling the pixels 20 of the respective rows. The vertical scanning circuit 101 can include, for example, a logic circuit such as a shift resistor and/or address decoder.

Each column of the pixel array 100 is provided with a vertical output line 10, and pixel signals from the pixels 20 can be output to the vertical output line 10 for each column. The amplifier circuit 102 amplifies the pixel signals output to each vertical output line 10, and can perform correlated double sampling processing based on signals at the time of reset and photoelectrically converted signals. The amplifier circuit 102 can include a plurality of column amplifiers corresponding to the plurality of vertical output lines 10 of the pixel array 100, respectively. The horizontal scanning circuit 103 selects outputs from the plurality of column amplifiers of the amplifier circuit 102 in a predetermined order and supplies them to the output circuit 104. The output circuit 104 is formed by, for example, a differential amplifier, a buffer amplifier, and the like, and can output, to an external or internal device (for example, a processor) of the image capturing device 1, the pixel signals supplied from the amplifier circuit 102. The image capturing device 1 may include an A/D converter. The pixel array 100 may be formed by the plurality of pixels 20 which are one-dimensionally arranged. Alternatively, the pixel array 100 may be replaced by one pixel 20.

Figure 2:
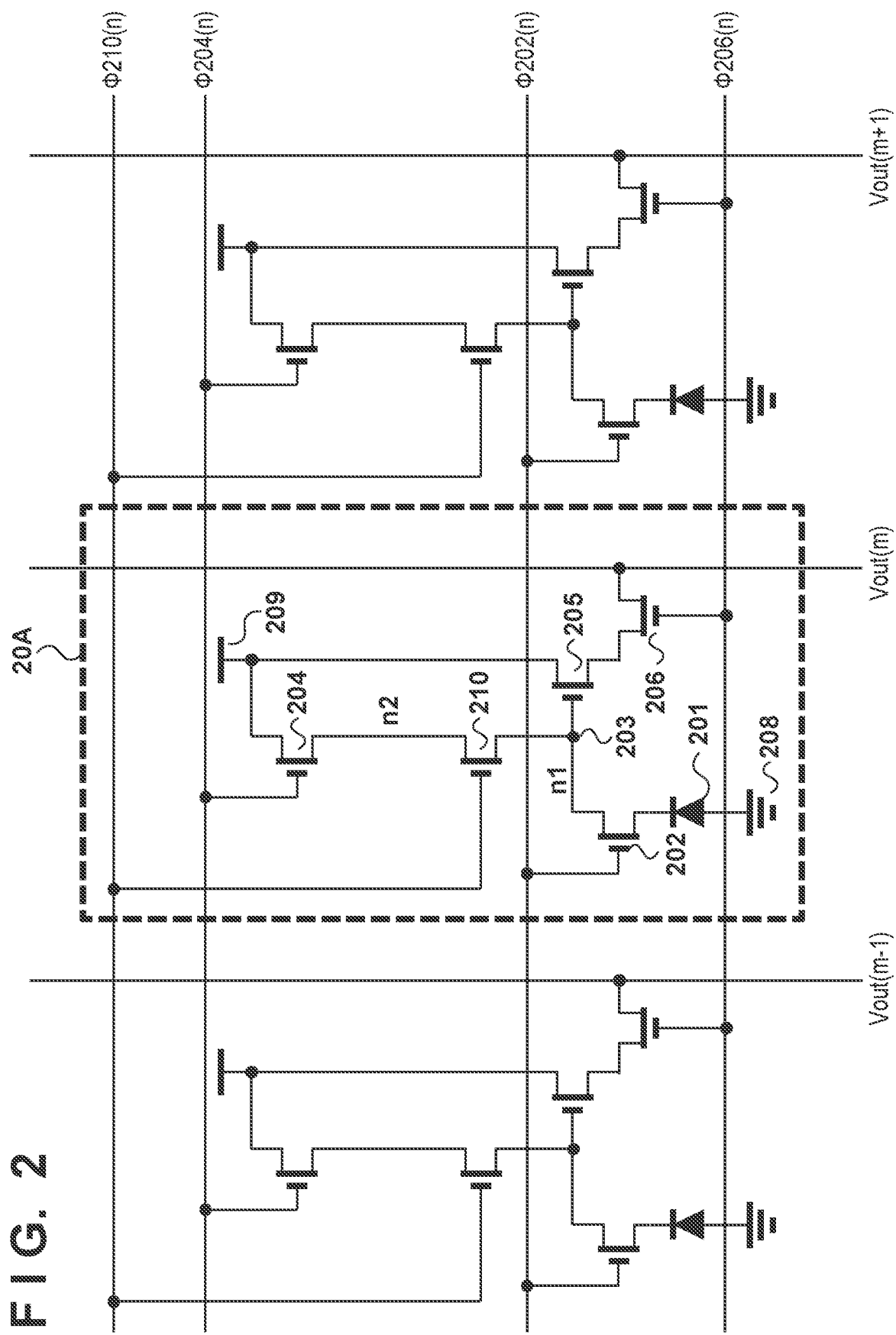
FIG. 2 is an equivalent circuit diagram showing the arrangement of a pixel according to a comparative example.

FIG. 2 is an equivalent circuit diagram showing the arrangement of a pixel 20A according to a comparative example. FIG. 2 shows three pixels 20A of 1 row×3 columns among the plurality of pixels 20A which are two-dimensionally arranged in a pixel array 100 to form a plurality of rows and a plurality of columns. However, the pixel array 100 can be formed by more pixels 20A. Each pixel 20A can include a photodiode (to be referred to as a PD hereinafter) 201 as a photoelectric converter, a transfer transistor 202, and a floating diffusion 203 (to be referred to as an FD 203 or a first node n1 hereinafter) functioning as a charge-to-voltage converter. Each pixel 20A can also include a reset transistor 204, an amplification transistor 205, and a selection transistor 206. The first electrode (for example, an anode) of the PD 201 can be connected to a first voltage line (for example, a ground line) 208. The second electrode (for example, a cathode) of the PD 201 can be connected to the FD 203 via the transfer transistor 202. In other words, the transfer transistor 202 transfers charges from the PD 201 to the FD 203. When a transfer signal φ202(n) supplied from a vertical scanning circuit 101 to the gate of the transfer transistor 202 via a transfer signal line is set to the active level, the transfer transistor 202 can transfer charges from the PD 201 to the FD 203. The transfer transistor 202 is an optional component and may be eliminated.

When a reset signal φ204(n) supplied from the vertical scanning circuit 101 to the gate of the reset transistor 204 via a reset signal line is set to the active level, the reset transistor 204 can reset the voltages of the second electrode (for example, the cathode) of the PD 201 and the FD 203. The amplification transistor 205 can output a signal corresponding to the voltage of the FD 203 to a vertical output line Vout. The amplification transistor 205 can form a source follower circuit together with a current source (not shown) connected to the vertical output line Vout. The vertical output line Vout is the vertical output line 10 shown in FIG. 1. In FIG. 2, to identify a column, a subscript is added to Vout like Vout(m−1), Vout(m), and Vout(m+1). When a selection signal φ206(n) supplied from the vertical scanning circuit 101 to the gate of the selection transistor 206 via a selection signal line is set to the active level, the selection transistor 206 electrically connects the amplification transistor 205 to the vertical output line Vout. The selection transistor 206 is an optional component and may be eliminated. In this case, the selected state and the unselected state of the pixel 20 can be distinguished from each other in accordance with a voltage set in the FD 203 at the time of reset.

The pixel 20A further includes a first transistor 210 in a path between the first node n1 (FD 203) and a second node n2 or the reset transistor 204. The second node n2 is a node that is not included in the path from the PD 201 to the first node n1. The first transistor 210 includes the first electrode (for example, a drain) connected to the first node n1 or the FD 203, and the second electrode (for example, a source) connected to the second node n2 or the first electrode (for example, a drain) of the reset transistor 204. The first transistor 210 functions as a capacitance addition transistor for adding a capacitance to the first node or the FD 203 (capacitance thereof). The capacitance that is added to the first node or the FD 203 (capacitance thereof) when the first transistor 210 is set in the conductive state (turned on) will be referred to as the capacitance (first capacitance) of the first transistor 210. When a sensitivity control signal φ210(n) supplied from the vertical scanning circuit 101 to the gate of the first transistor 210 via a sensitivity control line is set to the active level, the first transistor 210 is set in the conductive state. If the capacitance of the first transistor 210 is added to the first node n1 or the FD 203 (capacitance thereof), the capacitance of the first node n1 or the FD 203 and the capacitance of the first transistor 210 function as a charge-to-voltage converter, and thus the sensitivity for converting charges into a voltage deteriorates.

The first transistor 210 may be arranged in parallel with the reset transistor 204. In this case, however, even when the first transistor 210 is in the non-conductive state, the parasitic capacitance of the FD 203 increases, and thus the sensitivity for converting charges into a voltage deteriorates. Therefore, the first transistor 210 and the reset transistor 204 are preferably connected to the FD 203 in series.

When light enters the PD 201, photoelectric conversion occurs in the PD 201, and the thus generated charges can be accumulated in the charge accumulation region of the PD 201. When the transfer signal φ202(n) is set to the active level, the transfer transistor 202 is set in the conductive state to transfer the charges of the PD 201 to the FD 203. The amplification transistor 205 forms a source follower circuit, and can output a signal corresponding to the voltage of the FD 203 to the vertical output line 10 via the selection transistor 206.

If the first transistor 210 is in the non-conductive state (OFF state), the charges transferred from the PD 201 by the transfer transistor 202 are held by only the capacitance of the FD 203. On the other hand, if the first transistor 210 is in the conductive state (ON state), the charges transferred from the PD 201 by the transfer transistor 202 are held by the capacitance of the FD 203 and the capacitance of the first transistor 210. That is, under the control of the first transistor 210, the capacitance for holding the charges transferred from the PD 201 by the transfer transistor 202 can be changed. By simultaneously setting the reset transistor 204 and the first transistor 210 in the conductive state, the voltage of the FD 203 can be reset to a voltage corresponding to the voltage of a first voltage line 209.

The vertical scanning circuit 101 supplies a common control signal to each pixel 20A of the same row. That is, the control signals φ202(n), φ204(n), φ206(n), and φ210(n) are supplied to the transfer transistors 202, the reset transistors 204, the selection transistors 206, and the first transistors 210 of the nth row, respectively. These transistors are turned on when the control signals are at high level, and are turned off when the control signals are at low level. While the signal φ210(n) is at high level, the first transistor 210 can connect the first capacitance to the FD 203.

The first transistor 210 will now be described in more detail. The first transistor 210 includes one electrode (source) connected to the FD 203. When the first transistor 210 is set in the conductive state, a channel is formed in the first transistor 210, and a capacitance (MOS capacitance) by this channel is added to the capacitance of the FD 203. Furthermore, the parasitic capacitance of the other electrode (drain) of the first transistor 210, for example, the capacitance between the gate electrode and the other electrode (drain), the p-n junction capacitance of a semiconductor region forming the other electrode, and the capacitance with the peripheral wiring are added to the capacitance of the FD 203. When the capacitance is added to the FD 203 to increase the capacitance of the charge-to-voltage converter, charges that can be held by the charge-to-voltage converter increase, thereby expanding the dynamic range. If the first transistor 210 is set in the non-conductive state, the capacitance of the first transistor 210 is not added to the FD 203. In this case, the sensitivity (for example, a voltage change amount (charge-to-voltage conversion efficiency) with respect to one charge) of the pixel 20A or the FD 203 can be improved. Thus, under the control of the first transistor 210, the sensitivity of the pixel 20A can be changed.

Figure 3:
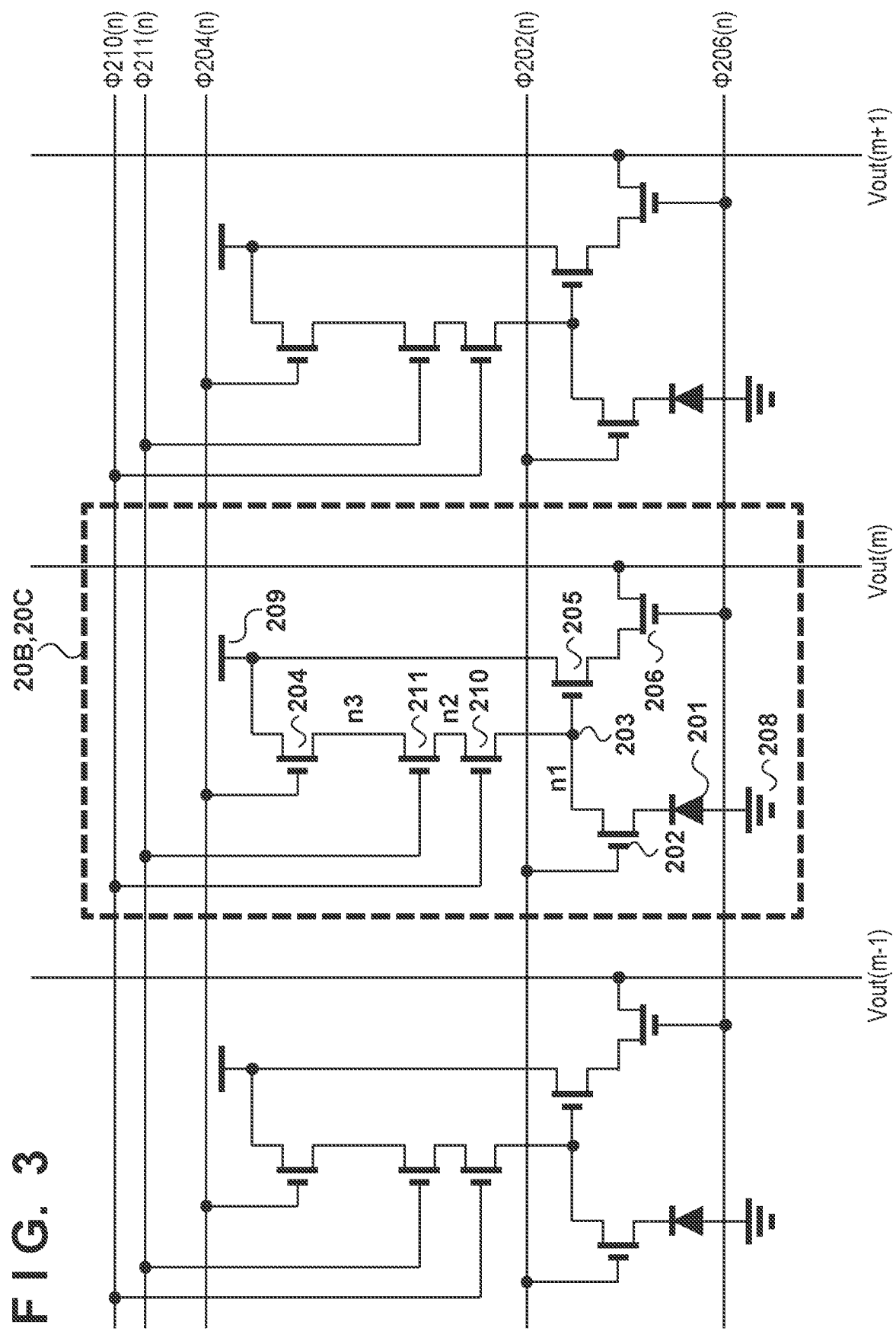
FIG. 3 is an equivalent circuit diagram showing the arrangement of pixels according to another comparative example and the first embodiment.

FIG. 3 is an equivalent circuit diagram showing the arrangement of a pixel 20B according to another comparative example and a pixel 20C according to the first embodiment. The pixels 20B and 20C have the same arrangement in the equivalent circuit. Each of the pixels 20B and 20C has the arrangement obtained by adding a second transistor 211 to the pixel 20A. When a sensitivity control signal $\varphi 211(n)$ supplied from a vertical scanning circuit 101 to the gate of the second transistor 211 via a sensitivity control line is set to the active level, the second transistor 211 is set in the conductive state. As described above, if a first transistor 210 is set in the conductive state, the capacitance (first capacitance) of the first transistor 210 is added to the capacitance of an FD 203 or a first node n1. If the second transistor 211 is set in the conductive state while the first transistor 210 is in the conductive state, the capacitance (second capacitance) of the second transistor 211 is added to the capacitance of the FD 203 in addition to the capacitance of the first transistor 210. At this time, the capacitance of the second transistor 211 is a capacitance to be added to a second node n2 when the second transistor 211 is set in the conductive state.

Each of the pixels 20B and 20C includes a PD 201 as a photoelectric converter, the first node n1 (FD 203) that is supplied with charges from the PD 201, and an amplification transistor 205 that outputs a signal corresponding to the voltage of the first node n1. Each of the pixels 20B and 20C can also include the first transistor 210 that opens/closes a path between the first node n1 and the second node n2, and the second transistor 211 that opens/closes a path between the second node n2 and a third node n3. Furthermore, each of the pixels 20B and 20C can include a transfer transistor 202, a reset transistor 204, and a selection transistor 206.

When a transfer signal $\varphi 202(n)$ supplied from the vertical scanning circuit 101 to the gate of the transfer transistor 202 via a transfer signal line is set to the active level, the transfer transistor 202 can transfer charges from the PD 201 to the first node n1 (FD 203). The transfer transistor 202 is an optional component and may be eliminated. When a reset signal $\varphi 204(n)$ supplied from the vertical scanning circuit 101 to the gate of the reset transistor 204 via a reset signal line is set to the active level, the reset transistor 204 can reset the voltages of the second electrode of the PD 201 and the first node n1 (FD 203). When a selection signal $\varphi 206(n)$ supplied from the vertical scanning circuit 101 to the gate of the selection transistor 206 via a selection signal line is set to the active level, the selection transistor 206 can electrically connect the amplification transistor 205 to a vertical output line Vout. The selection transistor 206 is an optional component and may be eliminated. In this case, the selected state and the unselected state of the pixel 20 can be distinguished from each other in accordance with a voltage set in the FD 203 at the time of reset.

When the first transistor 210 and the second transistor 211 are provided, the capacitance of the charge-to-voltage converter including the FD 203 can be changed in three stages. That is, the capacitance of the charge-to-voltage converter can be selected from capacitances of three stages. The capacitance of the first stage is the capacitance (that is, the capacitance of only the FD 203) of the charge-to-voltage converter when the first transistor 210 is in the non-conductive state. The capacitance of the second stage is the capacitance (that is, the sum of the capacitance of the FD 203 and the first capacitance of the first transistor 210) of the charge-to-voltage converter when the first transistor 210 is in the conductive state and the second transistor 211 is in the non-conductive state. The capacitance of the third stage is the capacitance (that is, the sum of the capacitance of the FD 203, the first capacitance of the first transistor 210 and the second capacitance of the second transistor 211) of the charge-to-voltage converter when the first transistor 210 and the second transistor 211 are in the conductive state.

Figure 4:
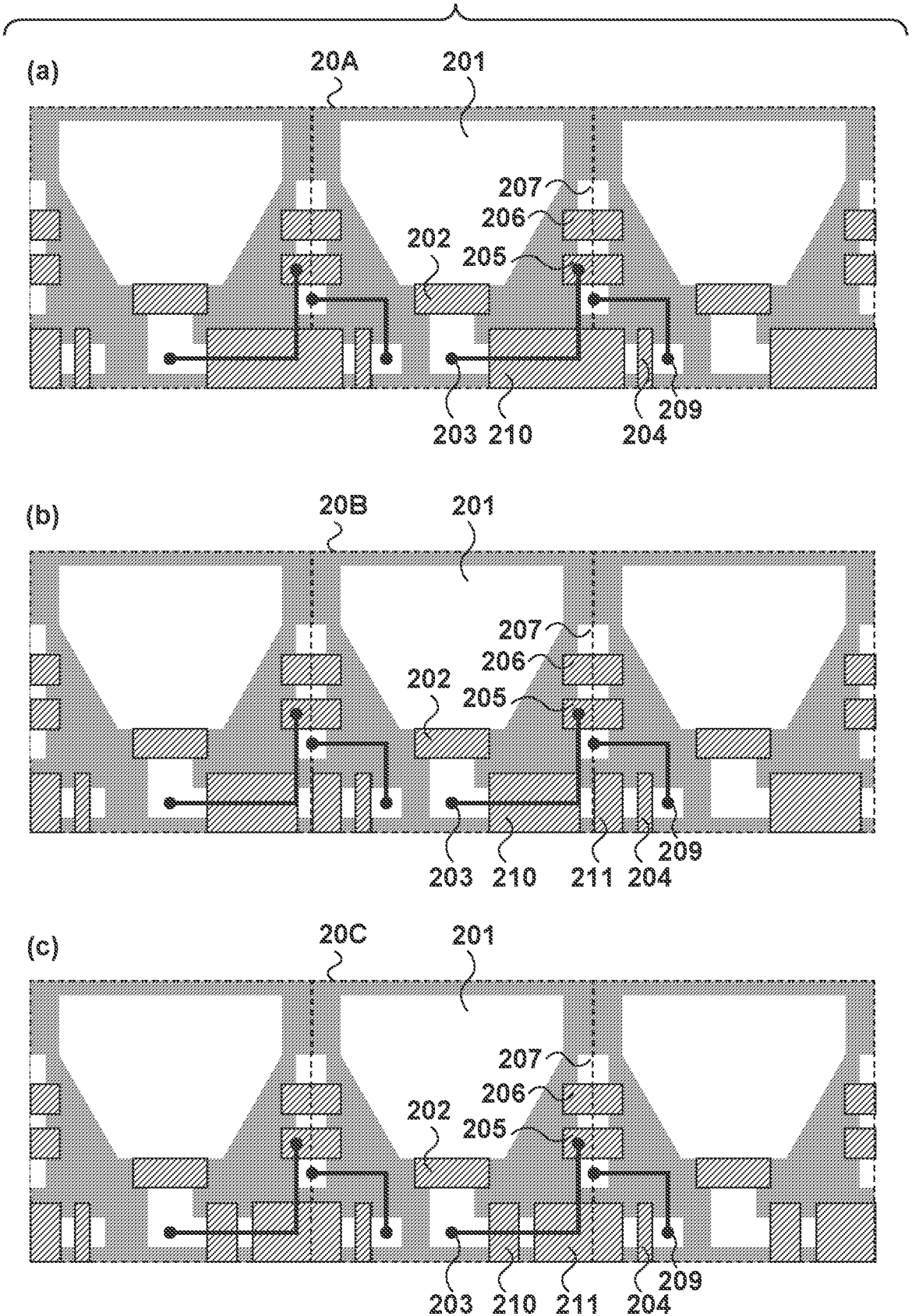
FIG. 4 shows plan views of the arrangements (layouts) of the pixels according to the comparative example, the other comparative example, and the first embodiment.

The arrangements of the pixel 20A (comparative example), the pixel 20B (other comparative example), and the pixel 20C will be described with reference to FIG. 4. In FIG. 4, (a) shows the arrangement of the pixel 20A, (b) shows the arrangement of the pixel 20B, and (c) shows the arrangement of the pixel 20C. The pixel 20A includes only the first transistor 210 as a transistor for controlling the capacitance of the charge-to-voltage converter. On the other hand, each of the pixels 20B and 20C includes the first transistor 210 and the second transistor 211 as transistors for controlling the capacitance of the charge-to-voltage converter.

The difference between the pixels 20B and 20C is the magnitude relationship between the capacitances of the first transistor 210 and the second transistor 211. While the capacitance of the first transistor 210 is larger than that of the second transistor 211 in the pixel 20B, the capacitance of the second transistor 211 is larger than that of the first transistor 210 in the pixel 20C. In this example, the capacitances of the first transistor 210 and the second transistor 211 can be proportional to the gate lengths, respectively. While the gate length of the first transistor 210 is longer than that of the second transistor 211 in the pixel 20B, the gate length of the second transistor 211 is longer than that of the first transistor 210 in the pixel 20C. In the pixels 20B and 20C, the gate width of the first transistor 210 is equal to that of the second transistor 211. However, the gate widths of the first transistor 210 and the second transistor 211 may be different from each other.

FIG. 5 exemplifies the capacitances of the FD 203, the first transistor 210, and the second transistor 211 in each of the pixels 20A, 20B, and 20C. In the example shown in FIG. 5, in the pixel 20A, the capacitance of the FD 203 is 0.25 [F], the capacitance of the first transistor 210 is 0.75, and the sum of the capacitances is 1 [F]. In the pixel 20B, the capacitance of the FD 203 is 0.25 [F], the capacitance of the first transistor 210 is 0.50 [F], the capacitance of the second transistor 211 is 0.25 [F], and the sum of the capacitances is 1 [F]. Furthermore, in the pixel 20C, the capacitance of the FD 203 is 0.25 [F], the capacitance of the first transistor 210 is 0.25 [F], the capacitance of the second transistor 211 is 0.50 [F], and the sum of the capacitances is 1 [F]. That is, FIG. 5 shows an example of the pixel 20B in which the capacitance of the first transistor 210 is larger than that of the second transistor 211, and an example of the pixel 20C in which the capacitance of the second transistor 211 is larger than that of the first transistor 210.

FIG. 6 exemplifies a gain, the number of signal charges, the capacitance of the charge-to-voltage converter, the number of noise charges of the charge-to-voltage converter, a signal output (S), a noise output (N), and an N/S ratio in each of the pixels 20A, 20B, and 20C. The gain of a column a is the gain (in this example, the gain is represented by [times]) of the image capturing device 1. The number of signal charges of a column b is the number of signal charges (in this example, charges are electrons) necessary to output a saturation signal corresponding to the gain. The saturation signal is the upper limit of an output in a captured image, which corresponds to each gain. If the number of signal charges necessary when the gain is 1 [times] is 1,000 [electrons], the number of signal charges necessary when the gain is 2 [times] is 500 [electrons]. The capacitance of a column c is a selectable optimum capacitance (in this example, farad [F]) of the charge-to-voltage converter to convert the number of signal charges indicated in the column b into a voltage. This indicates that if the number of signal charges is 1,000 [electrons], the optimum capacitance of the charge-to-voltage converter is 1 [F].

With respect to the pixel 20A, when the gain is 2 [times], the capacitance of the charge-to-voltage converter is 0.5 [F] which is ½ of the capacitance when the gain is 1 [times]. However, as shown in FIG. 5, the capacitance of the first transistor 210 is 0.75 [F] and thus the first transistor 210 cannot be turned off. When the gain is 4 [times], the capacitance of the charge-to-voltage converter is 0.25 [F] which is ¼ of the capacitance when the gain is 1 [times], and the first transistor 210 can be turned off.

With respect to the pixel 20B, when the gain is 2 [times], the capacitance of the charge-to-voltage converter is 0.5 [F] which is ½ of the capacitance when the gain is 1 [times]. As shown in FIG. 5, the capacitance of the second transistor 211 is 0.25 [F] and thus the second transistor 211 can be turned off.

When the gain is 4 [times], the capacitance of the charge-to-voltage converter is 0.25 [F] which is ¼ of the capacitance when the gain is 1 [times], and the first transistor 210 can be turned off.

With respect to the pixel 20C, when the gain is 2 [times], the capacitance of the charge-to-voltage converter is 0.5 [F] which is ½ of the capacitance when the gain is 1 [times]. As shown in FIG. 5, the capacitance of the second transistor 211 is 0.50 [F] and thus the second transistor 211 can be turned off.

When the gain is 4 [times], the capacitance of the charge-to-voltage converter is 0.25 [F] which is ¼ of the capacitance when the gain is 1 [times], and the first transistor 210 can be turned off.

The number of noise charges of a column d is the number of noise charges generated in the charge-to-voltage converter in accordance with the capacitance of the charge-to-voltage converter indicated in the column c. If noise generated when the capacitance of the charge-to-voltage converter is 1 [F] is 100 [electrons], it can be estimated that noise generated when the capacitance of the charge-to-voltage converter is 0.5 [F] is 50 [electrons]. When paying attention to the case in which the gain is 2 [times], the number of noise charges of the pixel 20A is 100 [electrons]. On the other hand, since it is possible to turn off the first transistor 210 in the pixel 20B, the capacitance of the charge-to-voltage converter decreases to 0.75 [F], and the number of noise charges is reduced to 75 [electrons]. Furthermore, in the pixel 20C, the capacitance of the second transistor 211 is large, as compared with the pixel 20B. Therefore, in the pixel 20C, the capacitance of the charge-to-voltage converter decreases to 0.50 [F] by turning off the second transistor 211, and the number of noise charges is reduced to 50 [electrons].

The signal output of a column e is a saturation signal output (S signal) based on the gain indicated in the column a and the number of signal charges indicated in the column b. The noise output of a column f is a noise output (N signal) based on the gain indicated in the column a and the number of noise charges indicated in the column d. For example, between a case in which the gain is 4 [times] and a case in which the gain is 8 [times], the capacitance of the charge-to-voltage converter remains the same and thus the number of noise charges remains unchanged but the N signal increases.

The N/S ratio of a column g is an N/S ratio as the ratio between the S signal and the N signal indicated in the columns e and f, respectively. A low N/S ratio indicates that the ratio of noise in the captured image is low and more satisfactory image quality is obtained. When paying attention to the case in which the gain is 2 [times], the N/S ratio decreases in the pixel 20B with respect to the pixel 20A, and further decreases in the pixel 20C with respect to the pixel 20B.

Figures 7, 8:
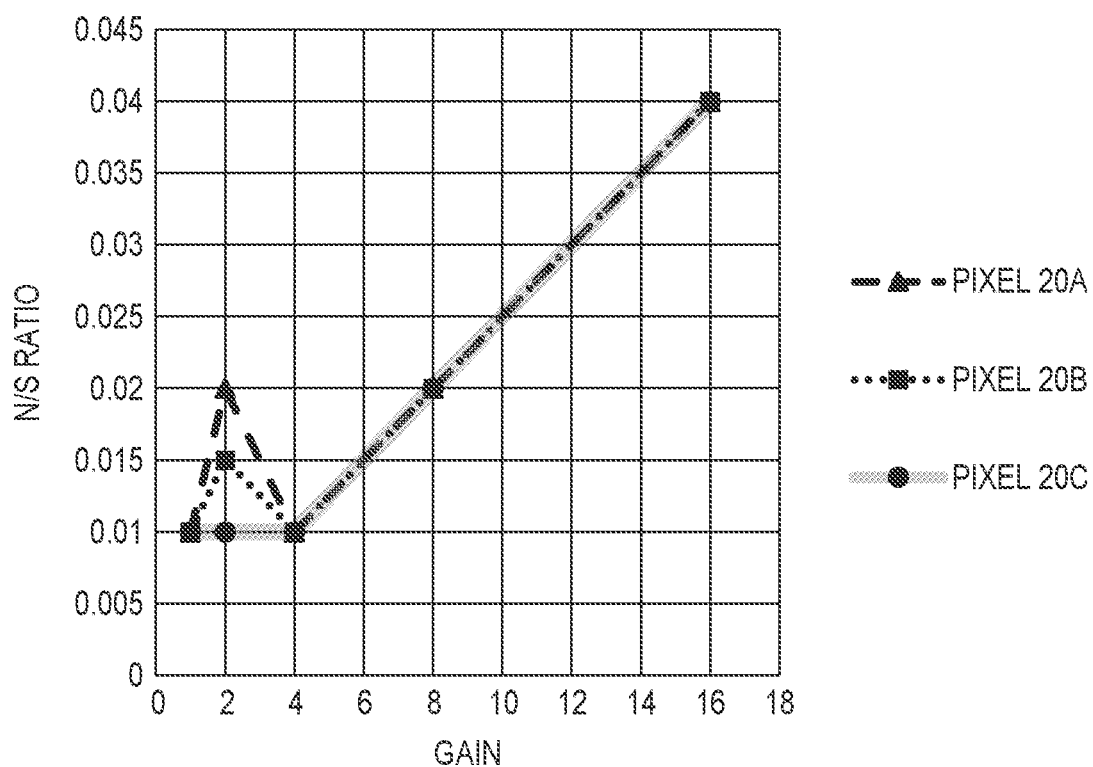
FIG. 7 is a graph for explaining the first embodiment.
FIG. 8 is a table for explaining an image capturing device according to the second embodiment.

FIG. 7 shows the N/S ratios in the pixels 20A, 20B, and 20C shown in FIG. 6. The abscissa represents the gain indicated in the column a of FIG. 6 and the ordinate represents the N/S ratio indicated in the column g of FIG. 6. As described above, when paying attention to the N/S ratio when the gain is 2 [times], it is indicated that the N/S ratio in the pixel 20B is lower than that in the pixel 20A and satisfactory image quality is obtained, and the N/S ratio in the pixel 20C is lower than that in the pixel 20B and more satisfactory image quality is obtained. Note that when the gain is 4 [times] or more, the capacitances of the charge-to-voltage converters are the same in the pixels 20A, 20B, and 20C and thus the N/S ratios remain unchanged.

As described above, in the first embodiment, in the arrangement in which the first transistor 210, the second transistor 211, and the reset transistor 204 are connected in series to the FD 203, the capacitance of the second transistor 211 is larger than that of the first transistor 210. This can provide satisfactory image quality with a low N/S ratio.

Note that it is also possible to make settings so that the capacitance of the FD 203, that of the first transistor 210, and that of the second transistor 211 are the same. Since, however, the gain of the image capturing device 1 changes by the power of 2, the ratio of each capacitance is desirably set, as in the above-described example.

Each of the capacitances (capacitance values) of the first transistor 210 and the second transistor 211 can be decided appropriately by adjusting the design of the transistor, a relative arrangement with respect to another wiring, and the like. Among others, the capacitance (MOS capacitance) obtained by forming the channel of the transistor has the highest capacity density, and thus adjustment of the area of the transistor (gate) is most efficient. On the other hand, if the area of the transistor (gate) is increased, for example, the area of the PD can become small. If the area of the PD becomes small, this may decrease the sensitivity, or decrease the saturated charge amount, which can be accumulated in the PD, to reduce the dynamic range.

It can be understood that the pixel 20C shown in (c) of FIG. 4 has a structure obtained by dividing the first transistor 210 of the pixel 20A shown in (a) of FIG. 4 into the first transistor and the second transistor 211. In the pixel 20C, the area ratio between the gate of the first transistor 210 and that of the second transistor 211 is almost equal to the ratio between the gate length of the first transistor 210 and that of the second transistor 211. That is, the fact that the capacitance of the second transistor 211 is larger than that of the first transistor 210 indicates that the gate length of the second transistor 211 is longer than that of the first transistor 210. In general, the transistor exhibits a roll-off characteristic with respect to the gate length. According to this, in the pixel 20C, the threshold of the first transistor 210 with the shorter gate length is smaller than that of the second transistor 211 with the longer gate length.

The thresholds and driving operations of the first transistor 210 and the second transistor 211 will now be described with reference to FIG. 8. FIG. 8 shows the driving operations of the first transistor 210, the second transistor 211, and the reset transistor 204 in a readout operation of a pixel signal. In operation A, the sensitivity control signals φ210 and φ211 are set to the active level (the first transistor 210 and the second transistor 211 are ON). Furthermore, in operation A, the reset signal φ204 changes like a pulse. This resets the capacitances of the FD 203, the first transistor 210, and the second transistor 211. In operation B, the signals φ210 and φ204 are set to the active level (the first transistor 210 and the reset transistor 204 are ON). Furthermore, in operation B, the signal φ211 changes like a pulse. This resets the capacitances of the FD 203 and the first transistor 210. In operation C, the signals φ211 and φ204 are set to the active level (the second transistor 211 and the reset transistor 204 are ON). Furthermore, in operation C, the signal φ210 changes like a pulse. This resets the FD 203.

In operation A, the second transistor 211 is continuously in the ON state. However, if the threshold of the second transistor 211 is large, the voltage dependency of the capacitance of the second transistor 211, which depends on the operation point of the FD 203, may become large. That is, there may be a difference between the capacitance of the second transistor 211 at the time of low luminance when the voltage of the charge-to-voltage converter including the FD 203 is high and that at the time of high luminance when the voltage of the charge-to-voltage converter is low. In this case, since the charge-to-voltage conversion efficiency changes depending on the luminance, the reality characteristic may deteriorate.

On the other hand, there is provided a method of decreasing the threshold of the second transistor 211 by adjusting the concentration of an impurity implanted to the channel of the second transistor 211. If the threshold of the second transistor 211 is decreased, the voltage dependency of the capacitance of the second transistor 211 is improved but another problem may arise. In operation B, the capacitances of the FD 203 and the first transistor 210 are reset by turning on and off the second transistor 211 by the signal φ211 like a pulse. Upon completion of reset, the second transistor 211 is turned off. At this time, if the threshold of the second transistor 211 is small, the voltage amplitude of the FD 203 may be limited. That is, if many charges photoelectrically converted in the PD 201 in accordance with a high-luminance object are transferred to the FD 203, the voltage of the FD 203 is to decrease by an amount corresponding to the charges. However, since the second transistor 211 operates as an amplitude limiting circuit by the small threshold, the second transistor 211 is released from the OFF state, and can operate so that the FD 203 is maintained at a voltage decided by an off-leak of the second transistor 211. Therefore, in operation B, when the voltage amplitude of the FD 203 is limited, the dynamic range may decrease.

Figure 9:
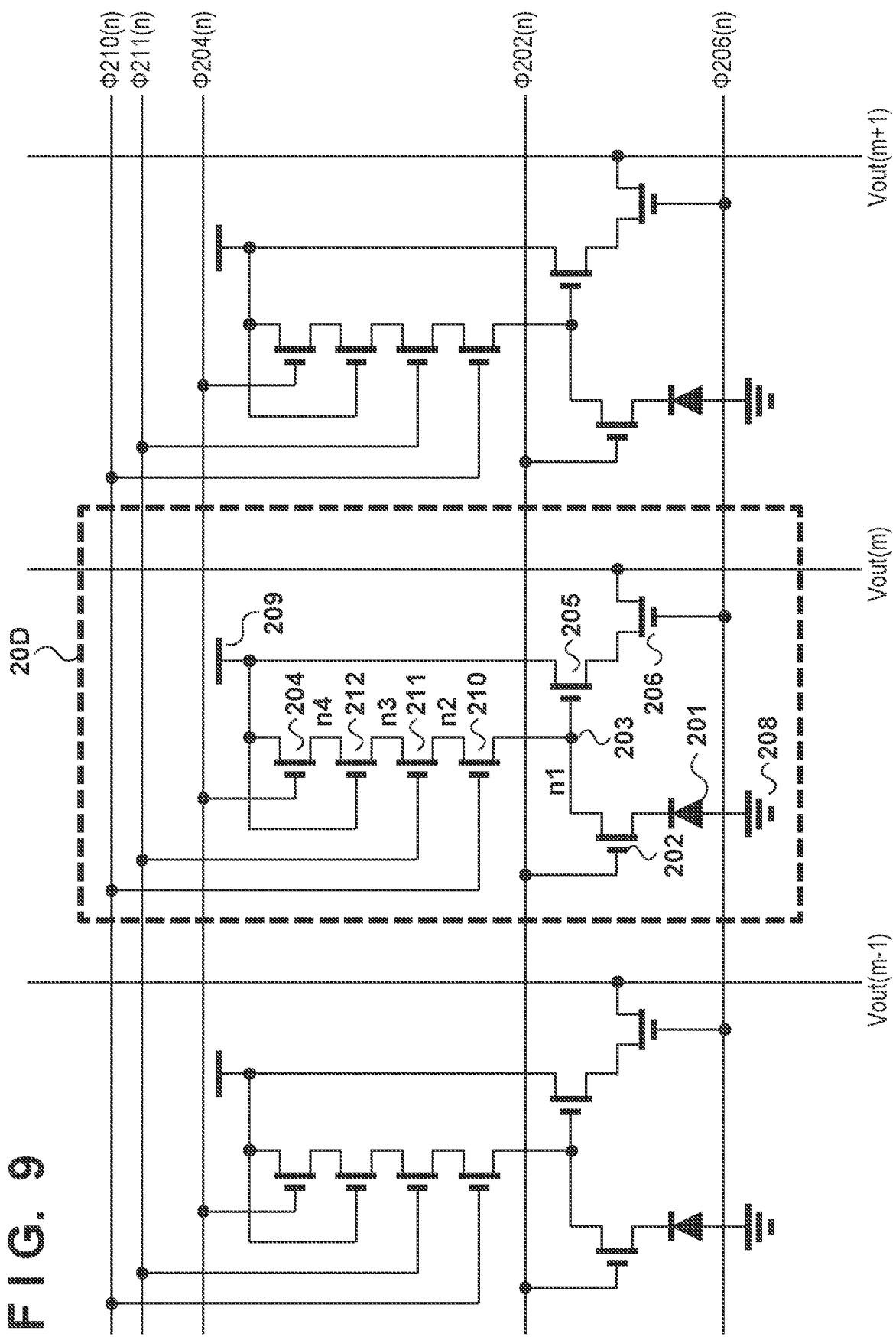
FIG. 9 is a circuit diagram showing the arrangement of a pixel according to the second embodiment.
Figure 10:
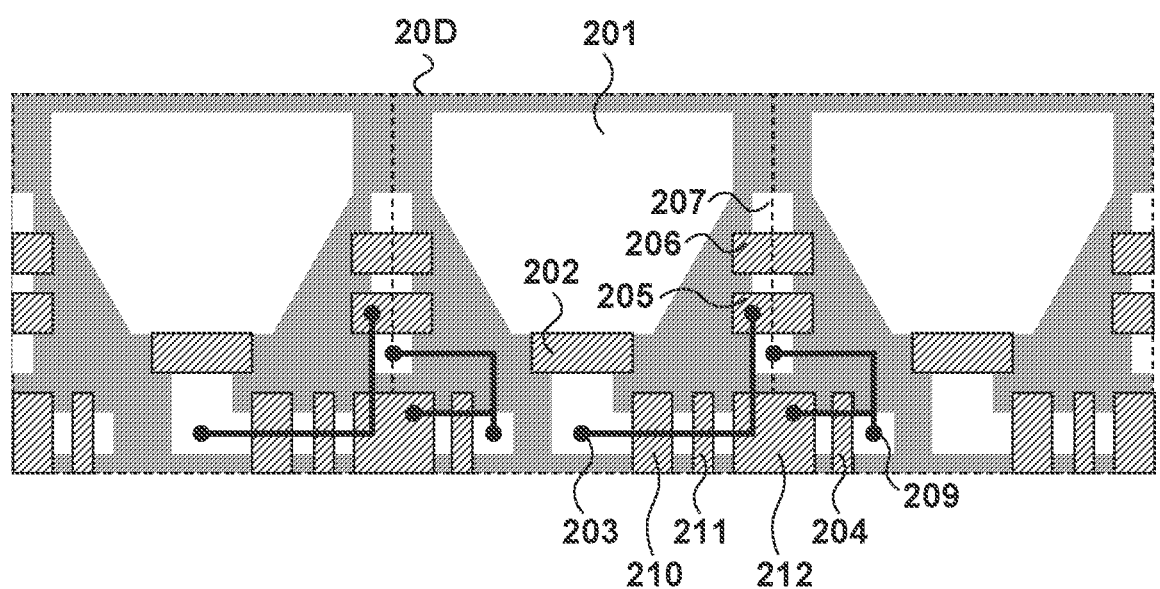
FIG. 10 is a plan view showing the arrangement (layout) of the pixel according to the second embodiment.

The second embodiment solves the above problem. FIG. 9 is an equivalent circuit diagram showing the arrangement of a pixel 20D of an image capturing device 1 according to the second embodiment. FIG. 10 shows the arrangement of the pixel 20D. Note that matters not mentioned in the second embodiment can comply with the first embodiment.

The pixel 20D according to the second embodiment has an arrangement obtained by adding a third transistor 212 to the pixel 20C of the first embodiment.

The pixel 20D includes a PD 201 as a photoelectric converter, a first node n1 (FD 203) that is supplied with charges from the PD 201, and an amplification transistor 205 that outputs a signal corresponding to the voltage of the first node n1. The pixel 20D can also include a first transistor 210 that opens/closes a path between the first node n1 and a second node n2, and a second transistor 211 that opens/closes a path between the second node n2 and a third node n3. The pixel 20D can include the third transistor 212 that opens/closes a path between the third node n3 and a fourth node n4. Furthermore, the pixel 20D can include a transfer transistor 202, a reset transistor 204, and a selection transistor 206. A fixed potential that always sets the third transistor 212 in the conductive state is applied to the gate of the third transistor 212. The gate of the third transistor 212 can be connected to, for example, a first voltage line 209.

It can be understood that the pixel 20D according to the second embodiment has an arrangement obtained by dividing the second transistor 211 of the pixel 20C of the first embodiment into the second transistor 211 and the third transistor 212. Since a voltage that always sets the third transistor 212 in the conductive state is applied to the gate of the third transistor 212, it is unnecessary to consider the OFF characteristic of the third transistor 212. That is, it is possible to sufficiently decrease the threshold of the third transistor 212, and to decrease the voltage dependency of the capacitance of the third transistor 212, which depends on the operation point of the FD 203. On the other hand, it is possible to sufficiently increase the threshold of the second transistor 211, and to relax the voltage amplitude limitation of the FD 203. According to the second embodiment, it is possible to improve the linearity characteristics in operation A and expand the dynamic range in operation B.

The second embodiment shows the example in which the third transistor 212 is added. However, more transistors may be added between the first node n1 and the reset transistor 204. In this case as well, the gate of a transistor having one end connected to the reset transistor 204 can be applied with a voltage that always sets the transistor in the conductive state.

Figure 11:
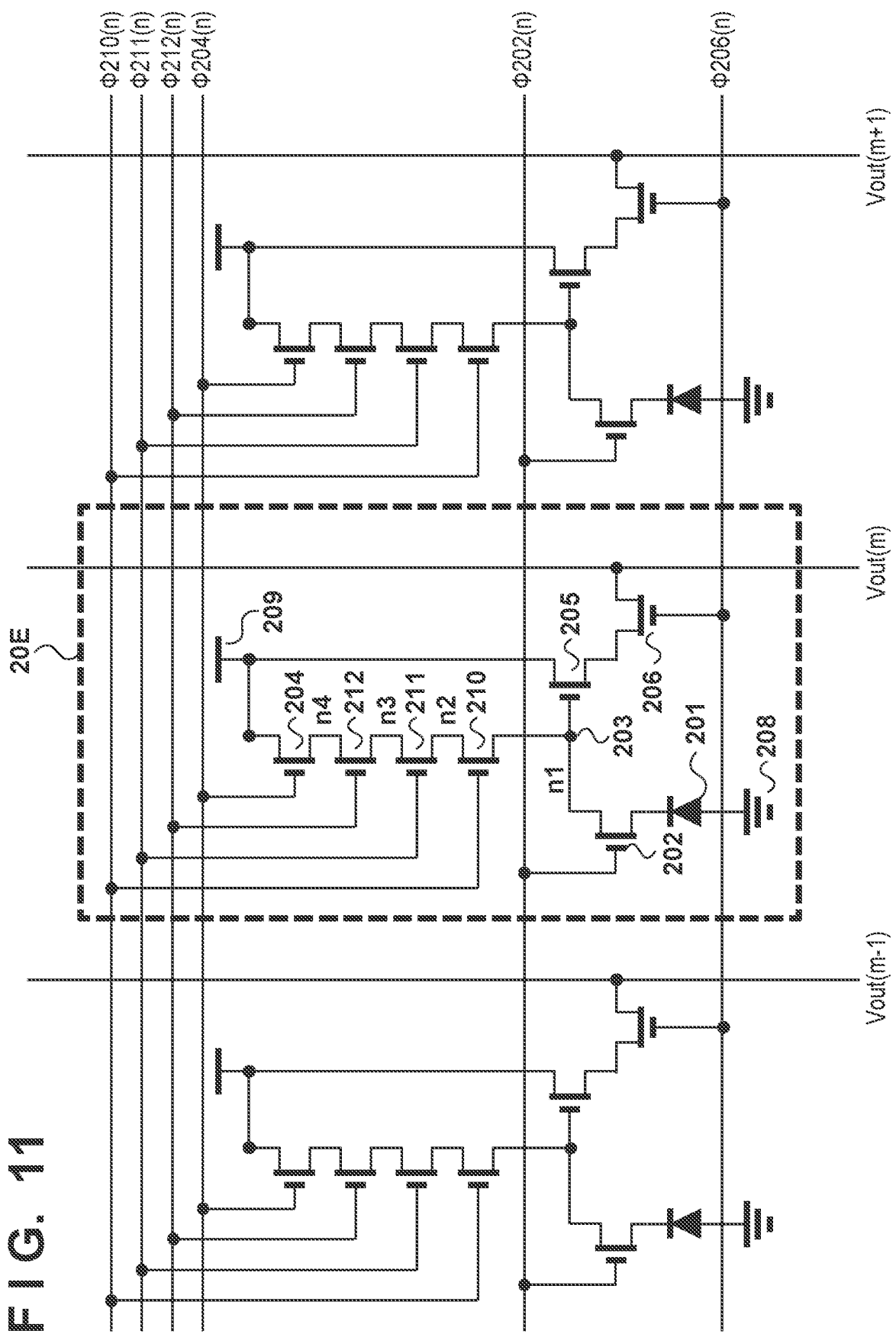
FIG. 11 is an equivalent circuit diagram showing the arrangement of a pixel according to the third embodiment.
Figures 12, 13:
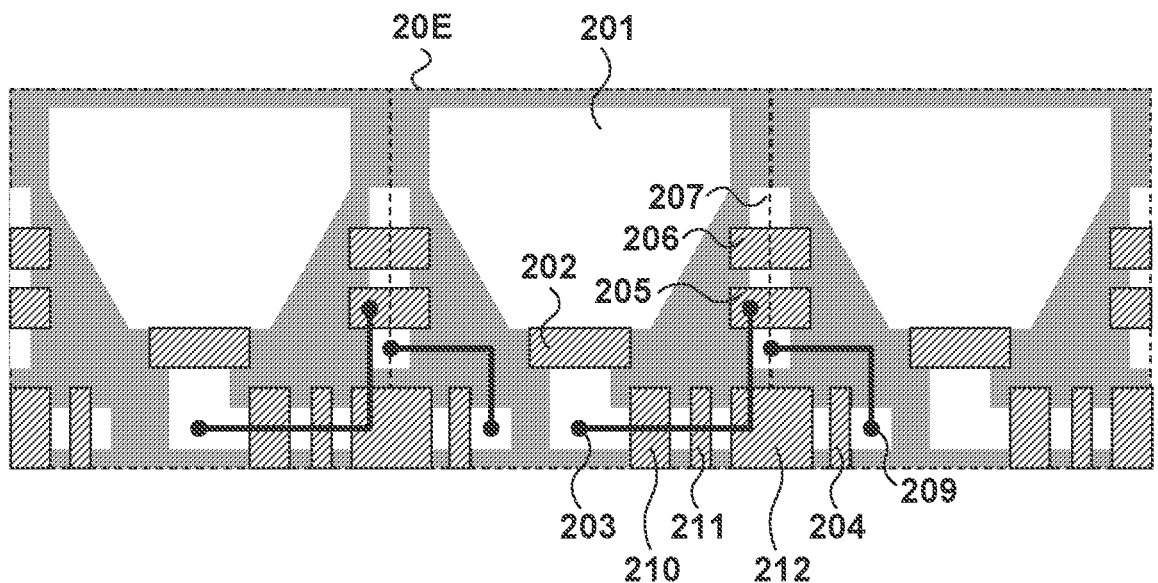
FIG. 12 is a plan view showing the arrangement (layout) of the pixel according to the third embodiment.
FIG. 13 is a table for explaining an image capturing device according to the third embodiment.

An image capturing device 1 according to the third embodiment will be described below. FIG. 11 is an equivalent circuit diagram showing the arrangement of a pixel 20E of the image capturing device 1 according to the third embodiment. FIG. 12 shows the arrangement of the pixel 20E. Note that matters not mentioned in the third embodiment can comply with the first embodiment. The pixel 20E according to the third embodiment has an arrangement obtained by adding a third transistor 212 to the pixel 20C of the first embodiment.

When a sensitivity control signal φ212(n) supplied from a vertical scanning circuit 101 to the gate of the third transistor 212 via a sensitivity control line is set to the active level, the third transistor 212 is set in the conductive state. As described above, if a first transistor 210 is set in the conductive state, the first capacitance of the first transistor 210 is added to the capacitance of an FD 203. Furthermore, if a second transistor 211 is set in the conductive state while the first transistor 210 is in the conductive state, the second capacitance of the second transistor 211 is added to the capacitance of the FD 203 in addition to the first capacitance of the first transistor 210. If the third transistor 212 is set in the conductive state while the first transistor 210 and the second transistor 211 are in the conductive state, the third capacitance of the third transistor 212 is added to the capacitance of the FD 203 in addition to the first capacitance of the first transistor 210 and the second capacitance of the second transistor 211. The third capacitance of the third transistor 212 is a capacitance to be added to the capacitance of the FD 203 when the third transistor 212 is set in the conductive state.

The pixel 20E includes a PD 201 as a photoelectric converter, a first node n1 (FD 203) that is supplied with charges from the PD 201, and an amplification transistor 205 that outputs a signal corresponding to the voltage of the first node n1. The pixel 20E can also include the first transistor 210 that opens/closes a path between the first node n1 and a second node n2, and the second transistor 211 that opens/closes a path between the second node n2 and a third node n3. The pixel 20E can include the third transistor 212 that opens/closes a path between the third node n3 and a fourth node n4. Furthermore, the pixel 20E can include a transfer transistor 202, a reset transistor 204, and a selection transistor 206.

When the first transistor 210, the second transistor 211, and the third transistor 212 are provided, the capacitance of the charge-to-voltage converter including the FD 203 can be changed in four stages. That is, the capacitance of the charge-to-voltage converter can be selected from capacitances of four stages. The capacitance of the first stage is the capacitance of the charge-to-voltage converter when the first transistor 210 is in the non-conductive state. The capacitance of the second stage is the capacitance of the charge-to-voltage converter when the first transistor 210 is in the conductive state and the second transistor 211 is in the non-conductive state. The capacitance of the third stage is the capacitance of the charge-to-voltage converter when the first transistor 210 and the second transistor 211 are in the conductive state and the third transistor 212 is in the non-conductive state. The capacitance of the fourth stage is the capacitance of the charge-to-voltage converter when the first transistor 210, the second transistor 211, and the third transistor 212 are in the conductive state. Note that the sensitivity control signal φ212(n) can be driven to the active level. An operation in this case is the same as in the second embodiment.

The thresholds and driving operations of the first transistor 210 and the second transistor 211 will now be described with reference to FIG. 13. FIG. 13 shows the driving operations of the first transistor 210, the second transistor 211, the third transistor 212, and the reset transistor 204 in a readout operation of a pixel signal. In operation A, sensitivity control signals φ210, φ211, and φ212 are set to the active level (the first transistor 210, the second transistor 211, and the third transistor 212 are ON). Furthermore, in operation A, a reset signal φ204 changes like a pulse. This resets the capacitances of the FD 203, the first transistor 210, the second transistor 211, and the third transistor 212. In operation B, the signals φ210, φ212, and φ204 are set to the active level (the first transistor 210, the third transistor 212, and the reset transistor 204 are ON). Furthermore, in operation B, the signal φ211 changes like a pulse. This resets the capacitances of the FD 203 and the first transistor 210. In operation C, the signals φ211 and φ204 are set to the active level (the second transistor 211 and the reset transistor 204 are ON). Furthermore, in operation C, the signal φ210 changes like a pulse. This resets the FD 203.

The third capacitance that is added to the third node n3 when the third transistor 212 is set in the conductive state is preferably larger than the second capacitance that is added to the second node n2 when the second transistor 211 is set in the conductive state. This is advantageous in providing satisfactory image quality with a low N/S ratio. The third capacitance that is added to the third node n3 when the third transistor 212 is set in the conductive state is preferably larger than the first capacitance that is added to the first node n1 or the FD 203 when the first transistor 210 is set in the conductive state. This is advantageous in providing satisfactory image quality with a low N/S ratio.

In one example, the gate length of the third transistor 212 may be longer than that of the second transistor 211. In this case, the gate width of the third transistor 212 may or may not be equal to that of the second transistor 211. In one example, the gate length of the third transistor 212 may be longer than that of the first transistor 210. In this case, the gate width of the third transistor 212 may or may not be equal to that of the first transistor 210.

The threshold of the third transistor 212 can sufficiently be decreased and the threshold of the second transistor 211 can sufficiently be increased. For example, the threshold of the third transistor 212 can be made smaller than that of the second transistor 211. As described in the second embodiment, this arrangement is advantageous in improving the linearity characteristics and improving the dynamic range.

To increase the capacitances of the first transistor 210 and the third transistor 212, the areas of the second transistor 211 and the reset transistor 204 may be made smaller than those of the first transistor 210 and the third transistor 212. The areas of the second transistor 211 and the reset transistor 204 can be made, for example, equal to each other.

As exemplified in FIG. 12, the first transistor 210 and the second transistor 211 can be arranged in a rectangular portion of an active region including the rectangular portion. Alternatively, as exemplified in FIG. 12, the first transistor 210, the second transistor 211, and the third transistor 212 can be arranged in a rectangular portion of an active region including the rectangular portion. Alternatively, as exemplified in FIG. 12, the first transistor 210, the second transistor 211, the third transistor 212, and the reset transistor 204 can be arranged in a rectangular portion of an active region including the rectangular portion.

As exemplified in FIG. 12, the PD 201 as a photoelectric converter can have a polygonal shape, and the channel length direction of the first transistor 210, the second transistor 211, and the third transistor 212 can be parallel to one side of the polygon of the PD 201. Alternatively, as exemplified in FIG. 12, the channel length direction of the first transistor 210, the second transistor 211, the third transistor 212, and the reset transistor 204 can be parallel to one side of the polygon of the PD 201. Note that in the example of FIG. 12, the channel length direction of the first transistor 210, the second transistor 211, the third transistor 212, and the reset transistor 204 is the horizontal direction on a paper surface.

An example of a photoelectric conversion system using a photoelectric conversion device of each of the above-described embodiments will be described below.

Figure 14:
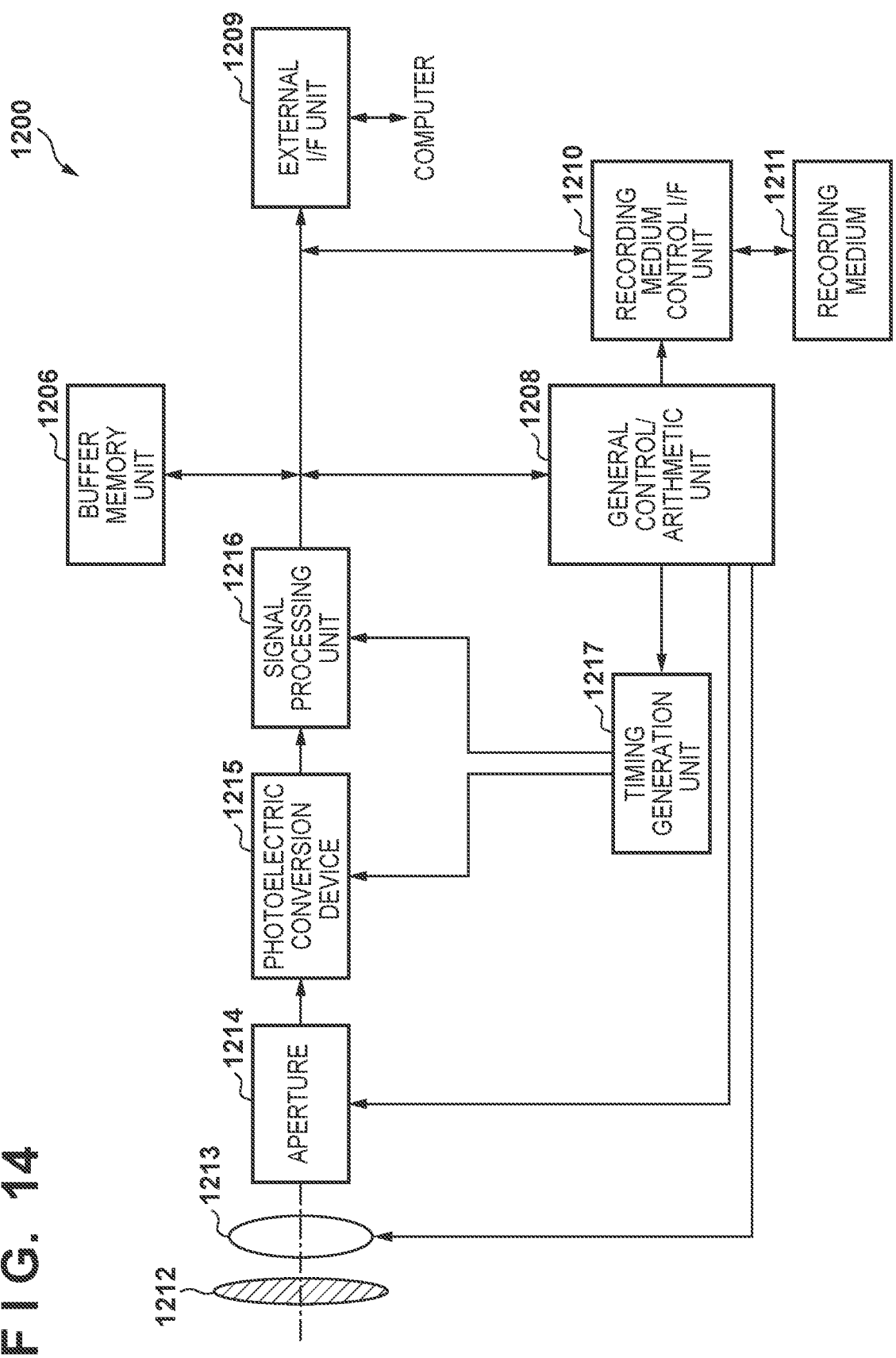
FIG. 14 is a block diagram showing the arrangement of a photoelectric conversion system according to an embodiment.

FIG. 14 is a block diagram showing the arrangement of a photoelectric conversion system 1200 according to this embodiment. The photoelectric conversion system 1200 according to this embodiment includes a photoelectric conversion device 1215. Any one of the photoelectric conversion devices described in the above embodiments can be applied as the photoelectric conversion device 1215. The photoelectric conversion system 1200 can be used as, for example, an image capturing system. Practical examples of the image capturing system are a digital still camera, a digital camcorder, and a monitoring camera. FIG. 14 shows an example of a digital still camera as the photoelectric conversion system 1200.

The photoelectric conversion system 1200 shown in FIG. 14 includes the photoelectric conversion device 1215, a lens 1213 for forming an optical image of an object on the photoelectric conversion device 1215, an aperture 1214 for changing the amount of light passing through the lens 1213, and a barrier 1212 for protecting the lens 1213. The lens 1213 and aperture 1214 form an optical system for concentrating light to the photoelectric conversion device 1215.

The photoelectric conversion system 1200 includes a signal processor 1216 for processing an output signal output from the photoelectric conversion device 1215. The signal processor 1216 performs an operation of signal processing of performing various kinds of correction and compression for an input signal, as needed, thereby outputting the resultant signal. The photoelectric conversion system 1200 further includes a buffer memory unit 1206 for temporarily storing image data and an external interface unit (external I/F unit) 1209 for communicating with an external computer or the like.

Furthermore, the photoelectric conversion system 1200 includes a recording medium 1211 such as a semiconductor memory for recording or reading out image capturing data, and a recording medium control interface unit (recording medium control I/F unit) 1210 for performing a recording or readout operation in or from the recording medium 1211. The recording medium 1211 may be incorporated in the photoelectric conversion system 1200 or may be detachable.

In addition, communication with the recording medium 1211 from the recording medium control I/F unit 1210 or communication from the external I/F unit 1209 may be performed wirelessly.

Furthermore, the photoelectric conversion system 1200 includes a general control/arithmetic unit 1208 that controls various kinds of operations and the entire digital still camera, and a timing generation unit 1217 that outputs various kinds of timing signals to the photoelectric conversion device 1215 and the signal processor 1216. In this example, the timing signal and the like may be input from the outside, and the photoelectric conversion system 1200 need only include at least the photoelectric conversion device 1215 and the signal processor 1216 that processes an output signal output from the photoelectric conversion device 1215. As described in the fourth embodiment, the timing generation unit 1217 may be incorporated in the photoelectric conversion device. The general control/arithmetic unit 1208 and the timing generation unit 1217 may be configured to perform some or all of the control functions of the photoelectric conversion device 1215.

The photoelectric conversion device 1215 outputs an image signal to the signal processor 1216. The signal processor 1216 performs predetermined signal processing for the image signal output from the photoelectric conversion device 1215 and outputs image data. The signal processor 1216 also generates an image using the image signal. Furthermore, the signal processor 1216 may perform distance measurement calculation for the signal output from the photoelectric conversion device 1215. Note that the signal processor 1216 and the timing generation unit 1217 may be incorporated in the photoelectric conversion device. That is, each of the signal processor 1216 and the timing generation unit 1217 may be provided on a substrate on which pixels are arranged or may be provided on another substrate. An image capturing system capable of acquiring a higher-quality image can be implemented by forming an image capturing system using the photoelectric conversion device of each of the above-described embodiments.

Figure 15A:
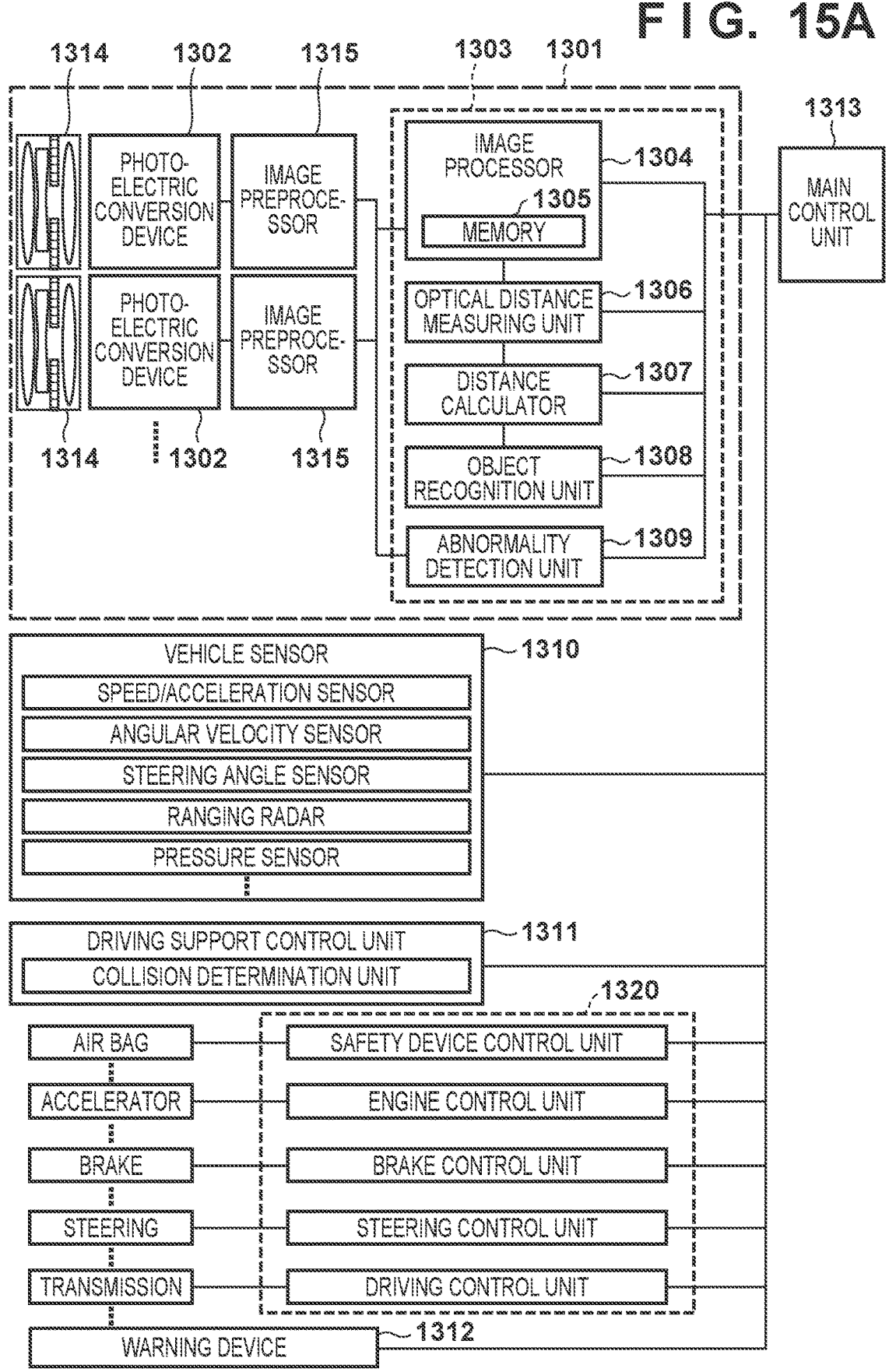
FIGS. 15A and 15B show views of the arrangement of a vehicle system and a photoelectric conversion system that is incorporated in the vehicle system and performs image capturing according to an embodiment.
Figure 15B:
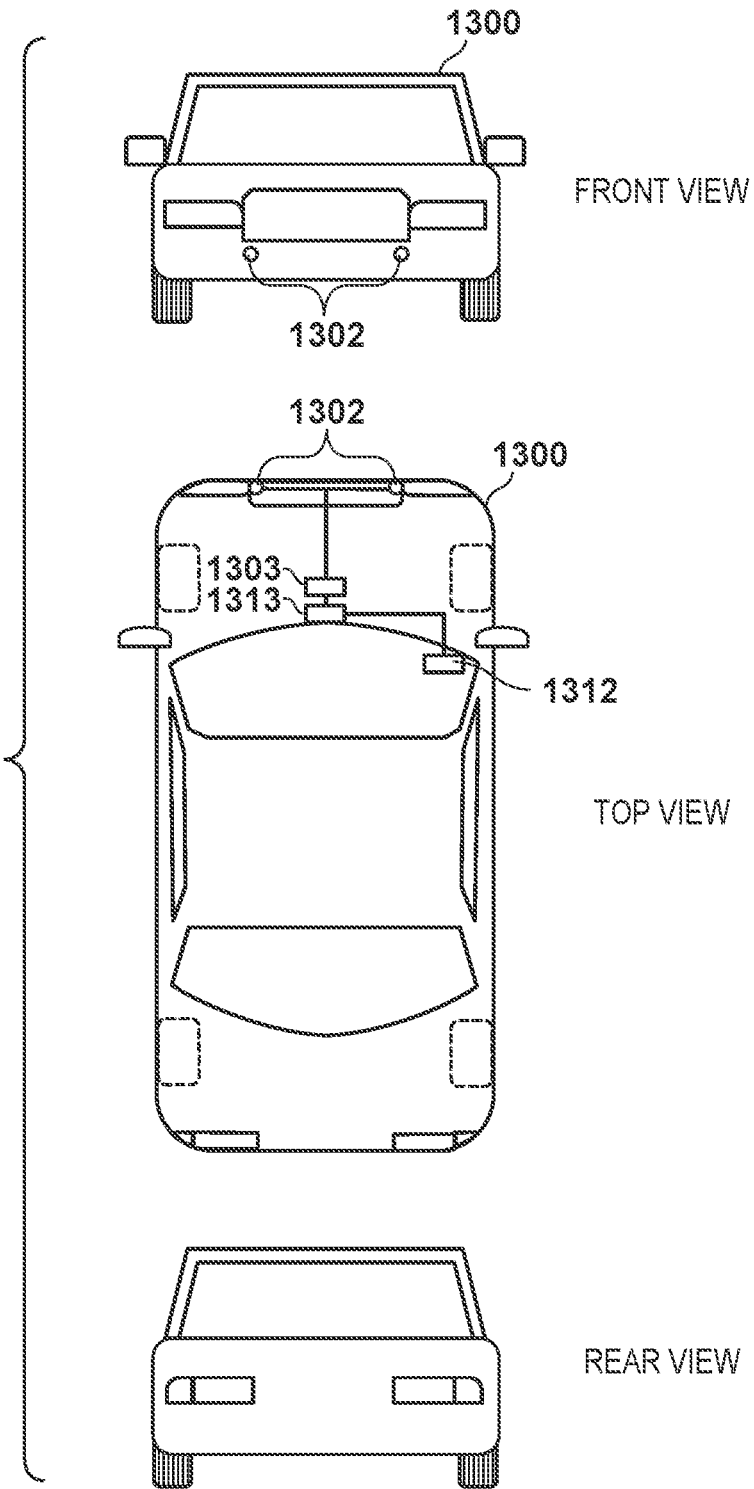
Figure 16:
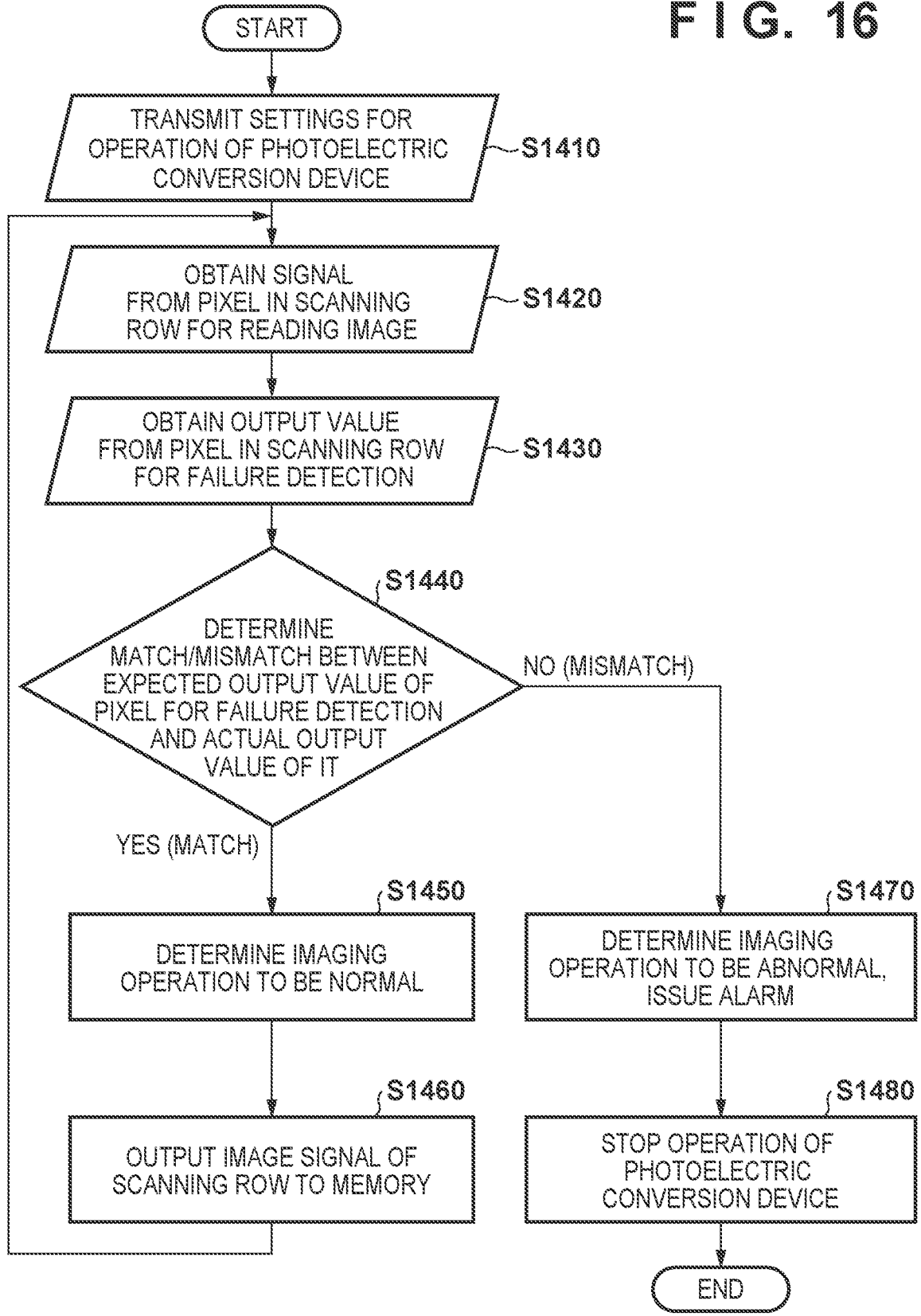
FIG. 16 is a flowchart illustrating the operation of the photoelectric conversion system shown in FIGS. 15A and 15B.

The photoelectric conversion system and a moving body according to this embodiment will be described with reference to FIGS. 15A, 15B and 16. FIGS. 15A and 15B are schematic views showing an example of the arrangement of the photoelectric conversion system and the moving body according to this embodiment. FIG. 16 is a flowchart illustrating the operation of the photoelectric conversion system according to this embodiment. This embodiment will describe an example of an in-vehicle camera as the photoelectric conversion system.

FIGS. 15A and 15B show an example of a vehicle system and a photoelectric conversion system that is incorporated in the vehicle system and performs image capturing. A photoelectric conversion system 1301 includes a photoelectric conversion device 1302, an image preprocessor 1315, an integrated circuit 1303, and an optical system 1314. The optical system 1314 forms an optical image of an object on the photoelectric conversion device 1302. The photoelectric conversion device 1302 converts, into an electrical signal, the optical image of the object formed by the optical system 1314. The photoelectric conversion device 1302 is one of the photoelectric conversion devices according to the above-described embodiments. The image preprocessor 1315 performs predetermined signal processing for the signal output from the photoelectric conversion device 1302. The function of the image preprocessor 1315 may be incorporated in the photoelectric conversion device 1302. In the photoelectric conversion system 1301, at least two sets of the optical systems 1314, the photoelectric conversion devices 1302, and the image preprocessor 1315 are arranged, and an output from the image preprocessor 1315 of each set is input to the integrated circuit 1303.

The integrated circuit 1303 is an image capturing system application specific integrated circuit, and includes an image processor 1304 with a memory 1305, an optical distance measurement unit 1306, a distance measurement calculation unit 1307, an object recognition unit 1308, and an abnormality detection unit 1309. The image processor 1304 performs image processing such as development processing and defect correction for the output signal from each image preprocessor 1315. The memory 1305 temporarily stores a captured image, and stores the position of a defect in the captured image. The optical distance measurement unit 1306 performs focusing or distance measurement of an object. The distance measurement calculation unit 1307 calculates distance measurement information from a plurality of image data acquired by the plurality of photoelectric conversion devices 1302. The object recognition unit 1308 recognizes objects such as a vehicle, a road, a road sign, and a person. Upon detecting an abnormality of the photoelectric conversion device 1302, the abnormality detection unit 1309 notifies a main control unit 1313 of the abnormality.

The integrated circuit 1303 may be implemented by dedicated hardware, a software module, or a combination thereof. Alternatively, the integrated circuit may be implemented by an FPGA (Field Programmable Gate Array), an ASIC (Application Specific Integrated Circuit), or a combination thereof.

The main control unit 1313 comprehensively controls the operations of the photoelectric conversion system 1301, vehicle sensors 1310, a control unit 1320, and the like. A method in which the photoelectric conversion system 1301, the vehicle sensors 1310, and the control unit 1320 each individually include a communication interface and transmit/receive control signals via a communication network (for example, CAN standards) may be adopted without providing the main control unit 1313.

The integrated circuit 1303 has a function of transmitting a control signal or a setting value to each photoelectric conversion device 1302 by receiving the control signal from the main control unit 1313 or by its own control unit.

The photoelectric conversion system 1301 is connected to the vehicle sensors 1310 and can detect the traveling state of the self-vehicle such as the vehicle speed, the yaw rate, and the steering angle, the external environment of the self-vehicle, and the states of other vehicles and obstacles. The vehicle sensors 1310 also serve as a distance information acquisition unit that acquires distance information to a target object. Furthermore, the photoelectric conversion system 1301 is connected to a driving support control unit 1311 that performs various driving support operations such as automatic steering, adaptive cruise control, and anti-collision functions. More specifically, with respect to a collision determination function, based on the detection results from the photoelectric conversion system 1301 and the vehicle sensors 1310, a collision with another vehicle or an obstacle is estimated or the presence/absence of a collision is determined. This performs control to avoid a collision when the collision is estimated or activates a safety apparatus at the time of a collision.

Furthermore, the photoelectric conversion system 1301 is also connected to an alarming device 1312 that generates an alarm to the driver based on the determination result of a collision determination unit. For example, if the determination result of the collision determination unit indicates that the possibility of a collision is high, the main control unit 1313 performs vehicle control to avoid a collision or reduce damage by braking, releasing the accelerator pedal, or suppressing the engine output. The alarming device 1312 sounds an alarm such as a sound, displays alarming information on the screen of a display unit such as a car navigation system or a meter panel, or applies a vibration to the seat belt or a steering wheel, thereby giving an alarm to the user.

The present invention is not limited to the above embodiments and various changes and modifications can be made within the spirit and scope of the present invention. Therefore, to apprise the public of the scope of the present invention, the following claims are made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-016039, filed Feb. 3, 2021, which is hereby incorporated by reference herein in its entirety.

What is claimed is:

1. A photoelectric conversion device comprising:
a photoelectric converter provided at a substrate;
a first node configured to be supplied with charges from the photoelectric converter;
an amplification transistor configured to output a signal corresponding to a voltage of the first node to an output line via a selection transistor;
a first transistor configured to open/close a path between the first node and a second node not included in a path from the photoelectric converter to the first node;
a second transistor configured to open/close a path between the second node and a third node; and
a third transistor arranged in a path between the third node and a fourth node,
wherein, in a planar view from a surface of the substrate, a first direction in which the first transistor, the second transistor, and the third transistor are arranged intersects a second direction in which the amplification transistor and the selection transistor are arranged.

2. The device according to claim 1, wherein the first direction is a channel length direction of each of the first transistor, the second transistor, and the third transistor.

3. The device according to claim 1, wherein a third capacitance which is added to the third node when the third transistor is set in a conductive state is larger than a second capacitance which is added to the second node when the second transistor is set in a conductive state.

4. The device according to claim 1, wherein a gate length of the third transistor is longer than a gate length of the second transistor.

5. The device according to claim 1, wherein a gate width of the third transistor is equal to a gate width of the second transistor.

6. The device according to claim 1, wherein the first transistor, the second transistor, and the third transistor are arranged in a first active region, and
wherein the amplification transistor is arranged in a second active region.

7. The device according to claim 6, wherein the selection transistor is arranged in the second active region.

8. The device according to claim 6, further comprising a reset transistor configured to open/close a path between the fourth node and a predetermined voltage line,
wherein the reset transistor is arranged in the first active region.

9. A photoelectric conversion system comprising:
a photoelectric conversion device according to claim 1; and
a signal processor configured to process a signal output from the photoelectric conversion device.

10. A moving body comprising:
a photoelectric conversion device according to claim 1;
a distance information acquisition unit configured to acquire distance information to a target object from distance measurement information based on a signal from the photoelectric conversion device; and
a control unit configured to control the moving body based on the distance information.

11. A photoelectric conversion device comprising:
a photoelectric converter provided at a substrate;
a first node configured to be supplied with charges from the photoelectric converter;
an amplification transistor configured to output a signal corresponding to a voltage of the first node to an output line via a selection transistor;
a first transistor configured to open/close a path between the first node and a second node not included in a path from the photoelectric converter to the first node;
a second transistor configured to open/close a path between the second node and a third node; and
a third transistor arranged in a path between the third node and a fourth node,
wherein, in a planar view from a surface of the substrate, a first direction in which a gate of the first transistor, a gate of the second transistor, and a gate of the third transistor are arranged intersects a second direction in which a gate of the amplification transistor and a gate of the selection transistor are arranged.

12. The device according to claim 11, wherein a source of the amplification transistor and a drain of the selection transistor, or a drain of the amplification transistor and a source of the selection transistor are arranged in the second direction.

13. A photoelectric conversion system comprising:
a photoelectric conversion device according to claim 11; and
a signal processor configured to process a signal output from the photoelectric conversion device.

14. The device according to claim 11, wherein the first direction is a channel length direction of each of the first transistor, the second transistor, and the third transistor.

15. The device according to claim 11, wherein a third capacitance which is added to the third node when the third transistor is set in a conductive state is larger than a second capacitance which is added to the second node when the second transistor is set in a conductive state.

16. The device according to claim 11, wherein a gate length of the third transistor is longer than a gate length of the second transistor.

17. The device according to claim 11, wherein a gate width of the third transistor is equal to a gate width of the second transistor.

18. The device according to claim 11, wherein the first transistor, the second transistor, and the third transistor are arranged in a first active region, and wherein the amplification transistor is arranged in a second active region.

19. The device according to claim 11, wherein the selection transistor is arranged in the second active region.

20. The device according to claim 11, further comprising a reset transistor configured to open/close a path between the fourth node and a predetermined voltage line,
wherein the reset transistor is arranged in the first active region.

21. A photoelectric conversion system comprising:
a photoelectric conversion device according to claim 15; and
a signal processor configured to process a signal output from the photoelectric conversion device.

22. A moving body comprising:
a photoelectric conversion device according to claim 11;
a distance information acquisition unit configured to acquire distance information to a target object from distance measurement information based on a signal from the photoelectric conversion device; and
a control unit configured to control the moving body based on the distance information.

* * * * *